June 24, 1958   A. G. DEAN ET AL   2,840,192
MOTOR-BRAKE MOUNT FOR POWER DRIVEN TRUCK
Filed Oct. 31, 1956   2 Sheets-Sheet 2

INVENTORS
Albert G. Dean
Floyd S. Leas, Jr.

BY Wm. R. Glisson
ATTORNEY

United States Patent Office 2,840,192
Patented June 24, 1958

2,840,192

MOTOR-BRAKE MOUNT FOR POWER DRIVEN TRUCK

Albert G. Dean, Narberth, and Floyd S. Leas, Jr., Oreland, Pa., assignors to The Budd Company, Philadelphia, Pa., a corporation of Pennsylvania Application October 31, 1956, Serial No. 619,538

5 Claims. (Cl. 188—59)

This invention relates to a motor-brake mount for a power driven truck and has for an object the provisions of improvements in this art.

When a truck-supported motor is used to drive one or more of the axles of a railway truck it greatly restricts the space near the axle. When disk brakes are provided for the axle of a truck the usual mounting frame for the brakes requires considerable space near the axle. When it is desired to have both a drive motor and disk brakes mounted near the axle of a truck it is necessary to make considerable alterations in the supports in order that each can have adequate space and operating action.

One arrangement for mounting a drive motor and disk brakes on a truck is shown in the patent to Harwick 2,371,621.

It is an object of the present invention to provide an improved mounting for a motor and disk brakes, one which is simpler, less expensive, easier to install and repair, and which has greater flexibility of action than previously has been provided.

The present motor mounting is especially useful for a truck, such as that shown in Patent Number 2,650,548, where a diesel engine drives the inboard axle of the truck and an electric motor is used to drive the outboard axle. Such an arrangement is particularly useful for self-propelled vehicles which operate on both electrified and non-electrified trackage. There are certain locations where electrified trackage enters a large urban center and local regulations do not permit fuel engines to be operated. It would be economically impractical to connect an electric locomotive to a single self-propelled car or even to a train of self-propelled cars to haul them in and out of the restricted zone. When such cars are in regular service, as for commuting between such restricted and outer non-restricted and possibly non-electrified zones, it is very advantageous to provide the cars with both types of propulsion means, the fuel engine being located inboard of the trucks where space is available and the electric motor being located toward the outboard end where space is more restricted. Specifically, the most desirable arrangement is to mount the fuel engine on the car body and drive through a flexible shaft connection; and to mount the motor on the truck.

According to the present invention the drive motor and brake mechanism support are formed as a unit and supported at the end distant from the axle by a yoke mechanism which provides full adjusting action of the motor and brakes.

The objects and various advantages of the invention will be apparent from the following description of an exemplary embodiment, reference being made to the accompanying drawings thereof, wherein.

Figure 1:
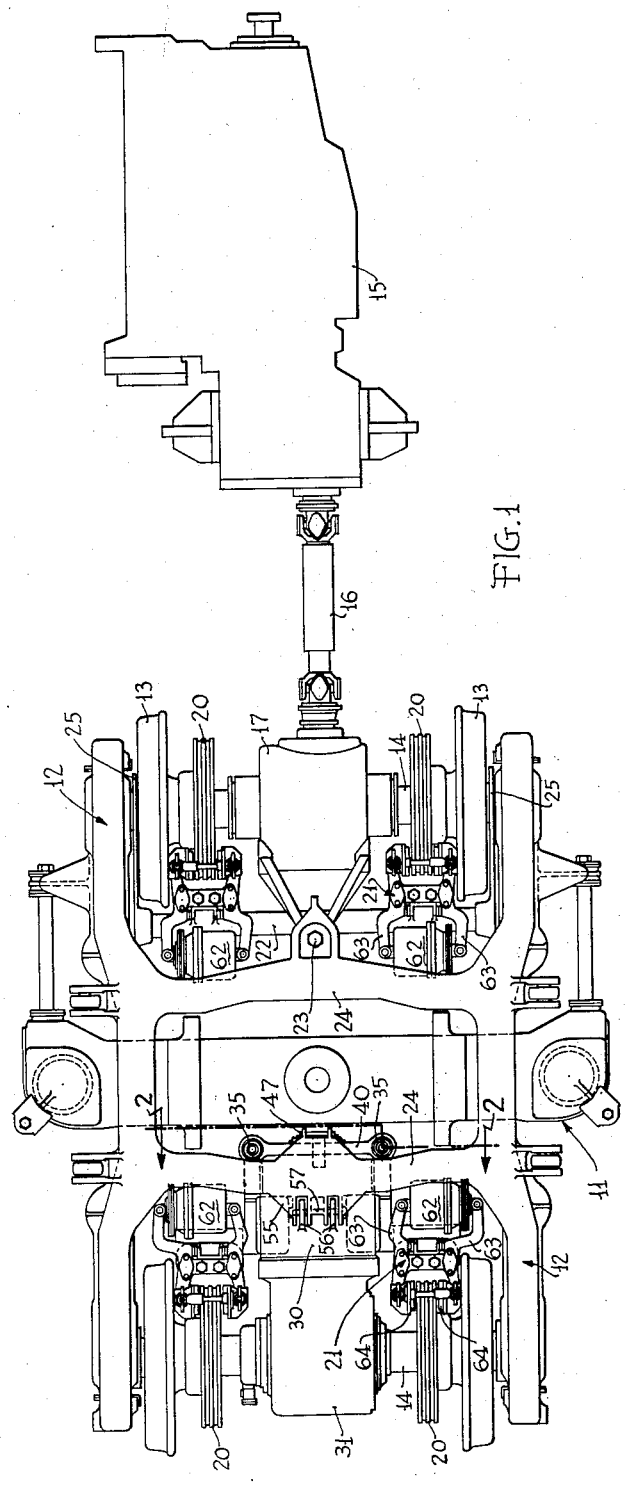
Fig. 1 is a plan view of a truck embodying the invention.
Figure 2:
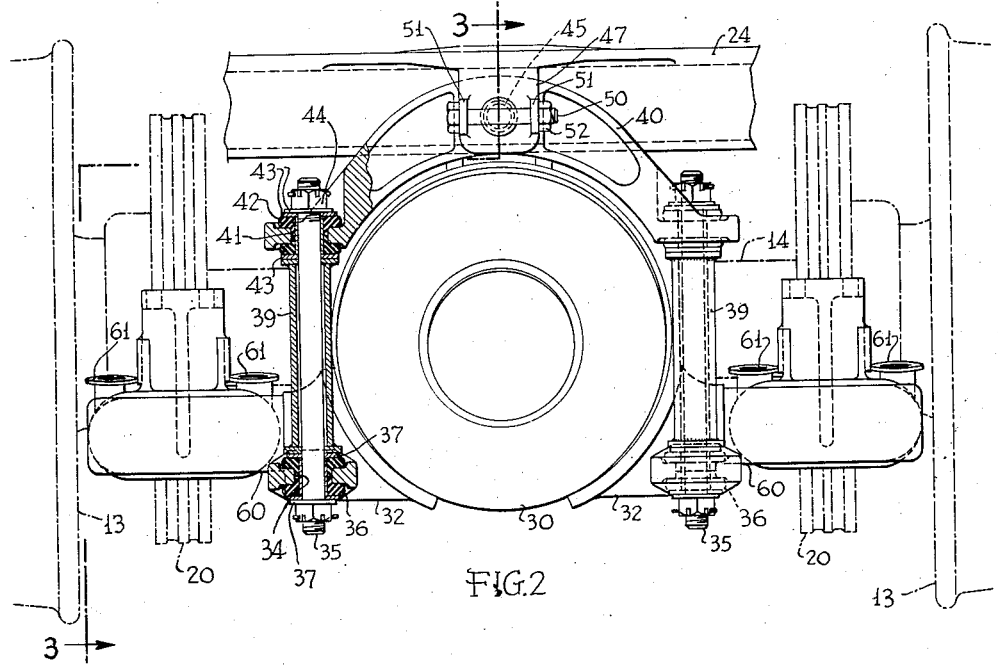
Fig. 2 is a vertical transverse section taken on the line 2—2 of Fig. 1.
Figure 3:
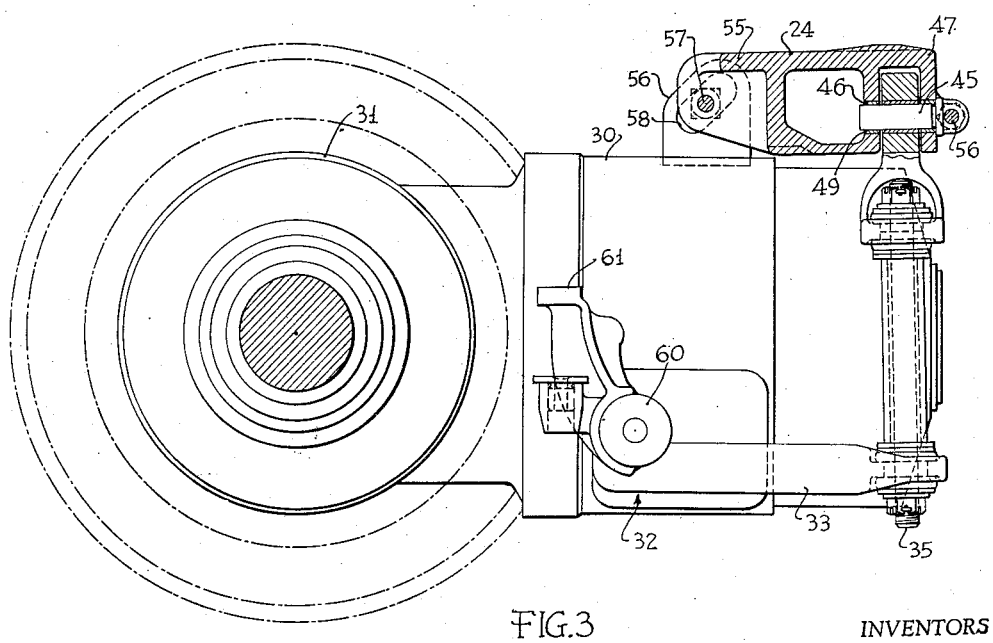
Fig. 3 is a vertical longitudinal section taken on the line 3—3 of Fig. 2.

A vehicle, such as a railway car, is provided with a truck 11 at each end. As shown, the truck is of the four-wheel type comprising a frame 12, wheels 13, and axles 14. Two wheels and the axle on which they are rigidly secured may be referred to as a wheel-axle unit.

The inboard wheel-axle unit of one or both trucks of the car is driven by a diesel engine 15, mounted under the car body, through a flexible shaft 16 which accommodates turning movements of the truck relative to the body. The engine is connected with the shaft by a suitable drive such as a fluid clutch-drive device built into the same casing with the engine. The shaft is connected to the axle through gearing, such as a "Spicer drive," enclosed in a gear box 17.

Disk brakes are used on the truck, both wheel-axle units having brakes, and as part of the brake installation each wheel-axle unit is provided with two brake disks 20, one near each wheel.

The arrangement for the inboard drive causes no difficulty in mounting the brake operating mechanisms 21 and the usual C-frame 22 is turnably mounted at a connection 23 near the center on an inner transom 24 of the truck frame. Arms 25 of the C-frame ride on arcuate seats of the journal box concentric with the axle axis as usual.

An electric motor 30 is connected by gearing in a casing 31 to drive the outboard axle. The gear casing is preferably formed integrally with the motor casing and has a sealed turning fit at outer spaced points along the axle in known manner.

According to the present invention there is secured to each side of the motor casing, as by arc welding, a fitting 32 provided with longitudinal extensions 33 having holes 34 to receive the lower ends of supporting rods 35. Specifically the holes are made large enough to have pressed therein the reduced portion of mating doughnuts 36 of rubber or the like. The doughnuts are confined between metal washers 37, which may be bonded thereto, and the washers are compressed between the flat end 38 of a sleeve 39 and a nut on the rod.

The rods at the upper ends are supported by an evener yoke 40, the rods extending through holes 41 in the yoke and being retained by rubber doughnuts 42, washers 43, nuts 44 and the flat ends of the sleeves 39 in like manner as for the lower ends.

At the center the yoke is supported by a headed pin 45 carried in bushed holes 46 of a lateral extension 47 of a transverse transom 24 of the truck frame. There is a bushing 49 in the hole in the yoke which fits on the pin 45. Pin 45 is retained by a bolt 50 over its head, the bolt being carried in apertured ears 51 on the bolster extension and having a securing nut 52.

The transom on the other side has lateral apertured extensions 55 spaced apart to receive slotted ears 56 which are secured to the motor casing. A safety bolt 57 is secured in the extensions 55 and passes loosely through slots 58 in the ears 56. By this arrangement wear on the safety bolt is avoided in normal use so it will have full strength if ever called upon to carry the load in case of possible failure of the normal supports.

At the ends toward the motor driven axle the fittings 32 are provided with stub bars 60 to which are secured, as by arc welding, the bases 61 on which the brake operating mechanisms 21 are mounted.

For purposes of identification the brake operating mechanism comprises a fluid power device 62, pivoted tong levers 63 operated thereby, and brake shoes 64 carrying non-metallic composition brake lining pads.

In operation, the support allows free turning movement about a longitudinal horizontal axis where the evener yoke is suspended from the transom so that the brakes can follow the turning movements of the wheel-axle unit. The resilient rubber doughnuts of the supporting rods offer some resistance to this movement without strongly opposing it and urge the parts to return to normal central position. The rods and their connections permit some vertical movement of the axle relative to the truck frame. Some side swing of the outer end of the motor casing (the end distant from the axle) is permitted but the connections resist the movement and prevent free swinging movement.

Braking reaction is taken through the motor casing to the axle.

The mounting is free from loose motion and noise because of the action of the rubber doughnut rod connections, which at the same time provide restrained movement in all directions.

It is thus seen that the invention provides a simple, sturdy mounting for the motor and brake units of a truck which will accommodate all movements of the brake shoes which are necessary to follow the movements of the brake disks but which offers resilient restraint to the movement and urges the parts to return to normal position.

While one embodiment of the invention has been described for purposes of illustration, it is to be understood that there may be various embodiments and modifications within the general scope of the invention.

What is claimed is:

1. A motor-brake mount for a power driven truck having side frames, cross transoms and wheel-axle units, comprising in combination, a motor having a drive connection with an axle, a motor casing mounted on the axle for turning movement of the axle therein, a fitting carried on each side of the motor casing, support rods connected at their lower ends to the casing fittings, an evener yoke pivotally mounted on a truck transom and supporting said rods, and brake units carried by said fittings on each side of the motor.

2. A motor-brake mount for a power driven truck having side frames, cross transoms and wheel-axle units with brake disks carried thereon near the wheels, comprising in combination, a motor having a drive connection with an axle, a motor casing mounted on the axle for turning movement of the axle therein, an evener yoke turnably supported on a truck transom, rods supporting the motor casing on said evener yoke on opposite sides of its pivot support, and brake units carried on the sides of the motor casing for cooperation with said disks.

3. A motor-brake mount for a power driven truck having side frames, cross transoms and wheel-axle units with brake disks carried thereon near the wheels, comprising in combination, a motor having a drive connection with an axle, a motor casing mounted on the axle for turning movement of the axle therein, an evener yoke turnably supported on a truck transom, rods supporting the motor casing on said evener yoke on opposite sides of its pivot support, and brake units carried on the sides of the motor casing for cooperation with said disks, the rod having resilient connections with said evener yoke and motor casing.

4. A motor-brake mount for a power driven truck having side frames, cross transoms and wheel-axle units with brake disks carried thereon near the wheels, comprising in combination, a motor having a drive connection with an axle, a motor casing mounted on the axle for turning movement of the axle therein, an evener yoke turnably supported on a truck transom, rods supporting the motor casing on said evener yoke on opposite sides of its pivot support, and brake units carried on the sides of the motor casing for cooperation with said disks, the rod having rubber-like doughnut connections with the evener yoke and said motor casing.

5. A motor-brake mount for a power driven truck having side frames, cross transoms and wheel-axle units with brake disks carried thereon near the wheels, comprising in combination, a motor-brake unit, an evener yoke carried on a longitudinal pivot on a transom, swivelly connected support rods supporting the motor-brake unit on the ends of said yoke, and a safety support connection between the transom and motor-brake unit including a slotted ear on one part and a pin on the other part extending loosely through the slot without touching in normal operations.

References Cited in the file of this patent
UNITED STATES PATENTS

| | | |
|---|---|---|
| 1,012,514 | Brown | Dec. 19, 1911 |
| 1,805,438 | Brownyer | May 12, 1931 |
| 2,330,912 | Pflager | Oct. 5, 1943 |
| 2,371,621 | Harwick | Mar. 20, 1945 |
| 2,650,548 | Dean | Sept. 1, 1953 |
| 2,690,242 | Casey | Sept. 28, 1954 |